US008286971B2

(12) United States Patent
Huang et al.

(10) Patent No.: US 8,286,971 B2
(45) Date of Patent: Oct. 16, 2012

(54) HOLDING FIXTURE

(75) Inventors: Kuo-Jung Huang, Taipei Hsien (TW); Jian Luo, Shenzhen (CN); Fu-Shun Huang, Taipei Hsien (TW); Shu-Wei Zhou, Shenzhen (CN); Yi-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1104 days.

(21) Appl. No.: 12/188,204

(22) Filed: Aug. 8, 2008

(65) Prior Publication Data

US 2009/0241750 A1 Oct. 1, 2009

(30) Foreign Application Priority Data

Mar. 25, 2008 (CN) .......................... 2008 1 0300698

(51) Int. Cl.
*B23B 31/22* (2006.01)

(52) U.S. Cl. ............................ 279/71; 279/81; 279/140

(58) Field of Classification Search .................... 279/71, 279/75, 81, 140, 905; *B23B 31/22*
See application file for complete search history.

(56) References Cited

U.S. PATENT DOCUMENTS

| | | | | |
|---|---|---|---|---|
| 1,309,815 | A * | 7/1919 | Schinkez | 279/19.4 |
| 2,475,861 | A * | 7/1949 | Thalmann | 279/71 |
| 3,708,178 | A * | 1/1973 | Lauricella | 279/81 |
| 4,188,041 | A * | 2/1980 | Soderberg | 279/75 |
| 4,231,581 | A * | 11/1980 | Benedict | 279/19.4 |
| 4,708,548 | A * | 11/1987 | Taylor et al. | 409/234 |
| 4,775,269 | A * | 10/1988 | Brix | 408/239 R |
| 5,427,482 | A * | 6/1995 | Asano et al. | 408/240 |
| 5,934,846 | A * | 8/1999 | Ishii | 408/141 |
| 6,325,393 | B1 | 12/2001 | Chen et al. | |
| 6,588,993 | B2 * | 7/2003 | Omi | 408/226 |
| 6,932,358 | B1 * | 8/2005 | Geisman et al. | 279/71 |
| 6,939,213 | B2 * | 9/2005 | Lovchik et al. | 451/360 |
| 7,896,590 | B2 * | 3/2011 | Miller et al. | 408/226 |

* cited by examiner

*Primary Examiner* — Eric A Gates
(74) *Attorney, Agent, or Firm* — Altis Law Group, Inc.

(57) ABSTRACT

A holding fixture includes a first part, a securing member and a second part. The first part includes a first end face and a sleeve extending from the first end face, the sleeve defines a plurality of radial through holes each receiving a ball therein, and each ball has a diameter larger than the wall thickness of the sleeve therein. The securing member located around the sleeve includes a plurality of protrusions configured on an inner wall thereof, with every two neighboring protrusions defining a notch therebetween. The second part includes a body and a tail fixed on the body, with seating thereof in the sleeve enabled by an annular groove in the periphery thereof. The protrusions guide the balls into the annular groove to secure the second part on the first part.

11 Claims, 8 Drawing Sheets

HOLDING FIXTURE

BACKGROUND

1. Field of the Invention

The present invention relates to punching systems and, specifically, to a holding fixture fixing a punching pin to a die base.

2. Description of Related Art

A die of a punch assembly comprises a die base and a punch fixed on the die base for punching workpieces. Generally, different punching requirements utilize different punches and, as a result, one die base should be able to accommodate various punches via a holding fixture fixing the punch on the die base.

Generally, one punch defines a plurality of holes therein for receiving a plurality of screws that fix the punch to the die base. When the punch needs changing, a tool is used to manually remove and install screws, which is both inconvenient and inefficient. Additionally, the holes in the punch restrict the working area of the punch, which occasionally affects the quality of the workpieces punched by the punch.

Thus, a need exists in the industry to address the described limitations.

SUMMARY

According to an exemplary embodiment of the present invention, a holding fixture comprises a first part, a securing member, and a second part. The first part comprises a first end face and a sleeve extending therefrom, wherein the sleeve defines a plurality of radial through holes each receiving a ball therein. Moreover, each ball has a diameter larger than the wall thickness of the sleeve therein.

The securing member located around the sleeve comprises a plurality of protrusions configured on an inner wall thereof, wherein every two neighboring protrusions define a notch therebetween. The second part comprises a body and a tail fixed on the body, with the tail, suitable for seating in the sleeve, defines an annular groove in the periphery thereof. The protrusions guide the balls into the annular groove for securing the second part onto the first part.

Other advantages and novel features will become more apparent from the following detailed description when taken in conjunction with the accompanying drawings, in which:

DETAILED DESCRIPTION OF THE EMBODIMENTS

Figure 1:
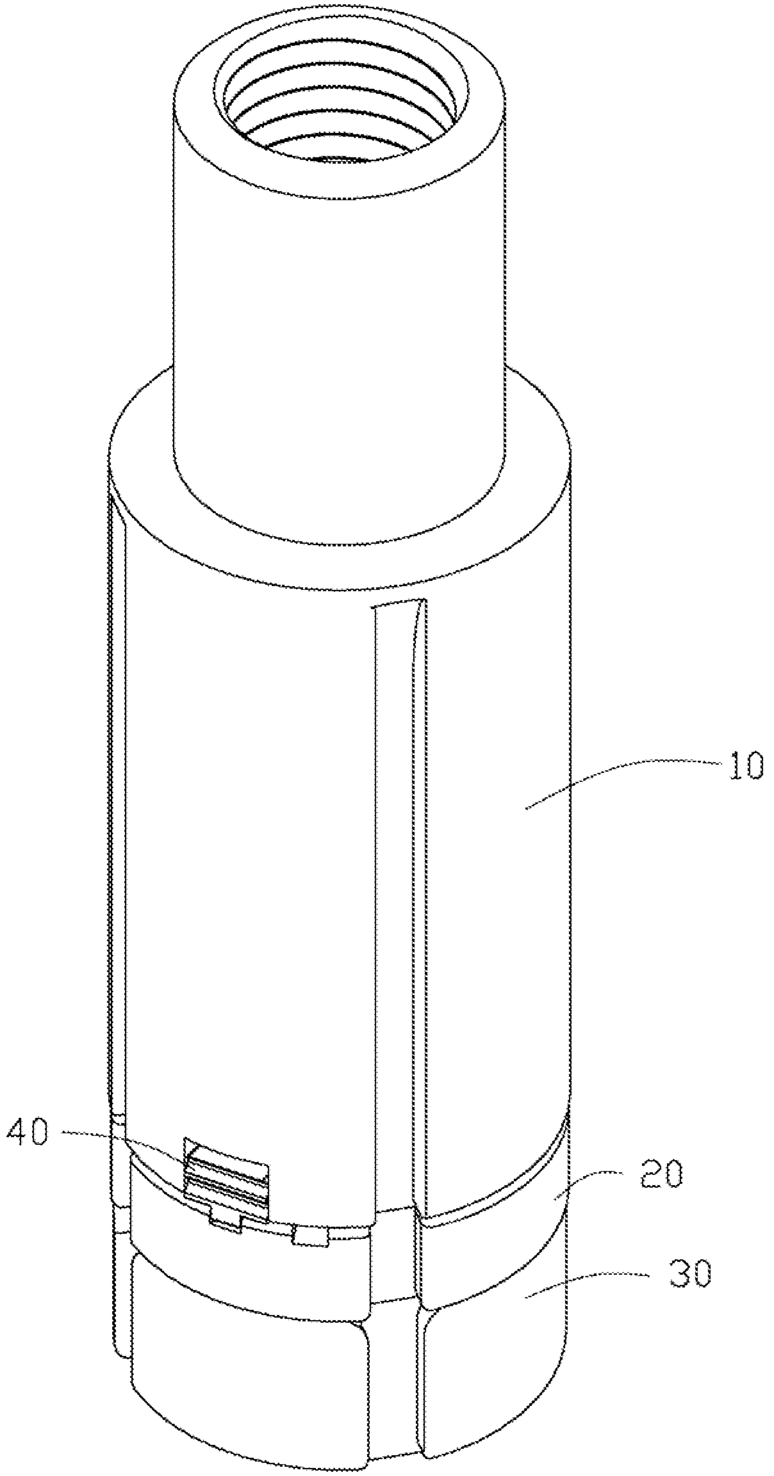
FIG. 1 is a perspective view of a holding fixture in accordance with an exemplary embodiment.

Referring to FIG. 1, a holding fixture comprises a first part 10, a securing member 20, a second part 30 and a locking block 40.

Figure 2:
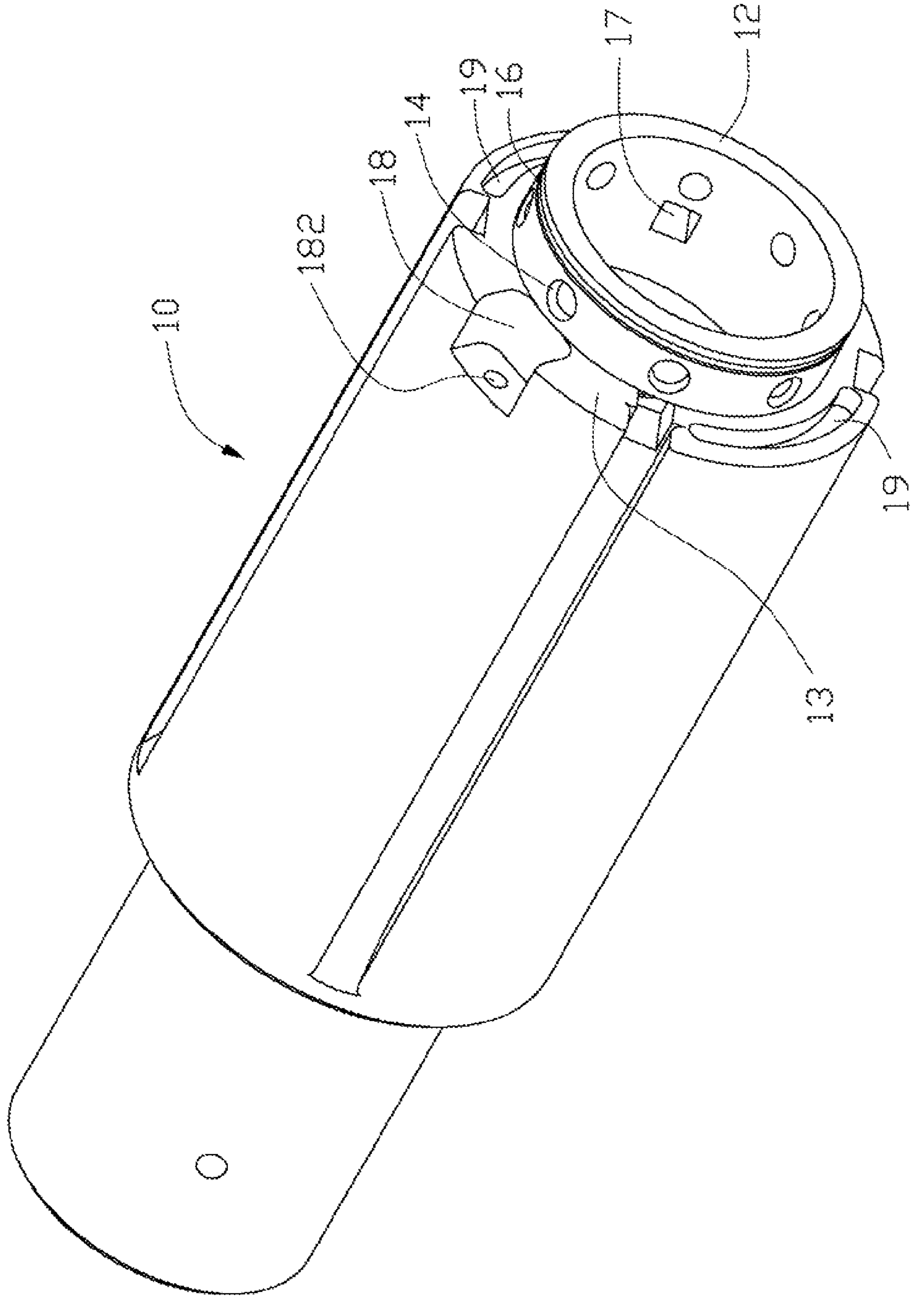
FIG. 2 is a perspective view of a first part of the holding fixture of FIG. 1.
Figure 7:
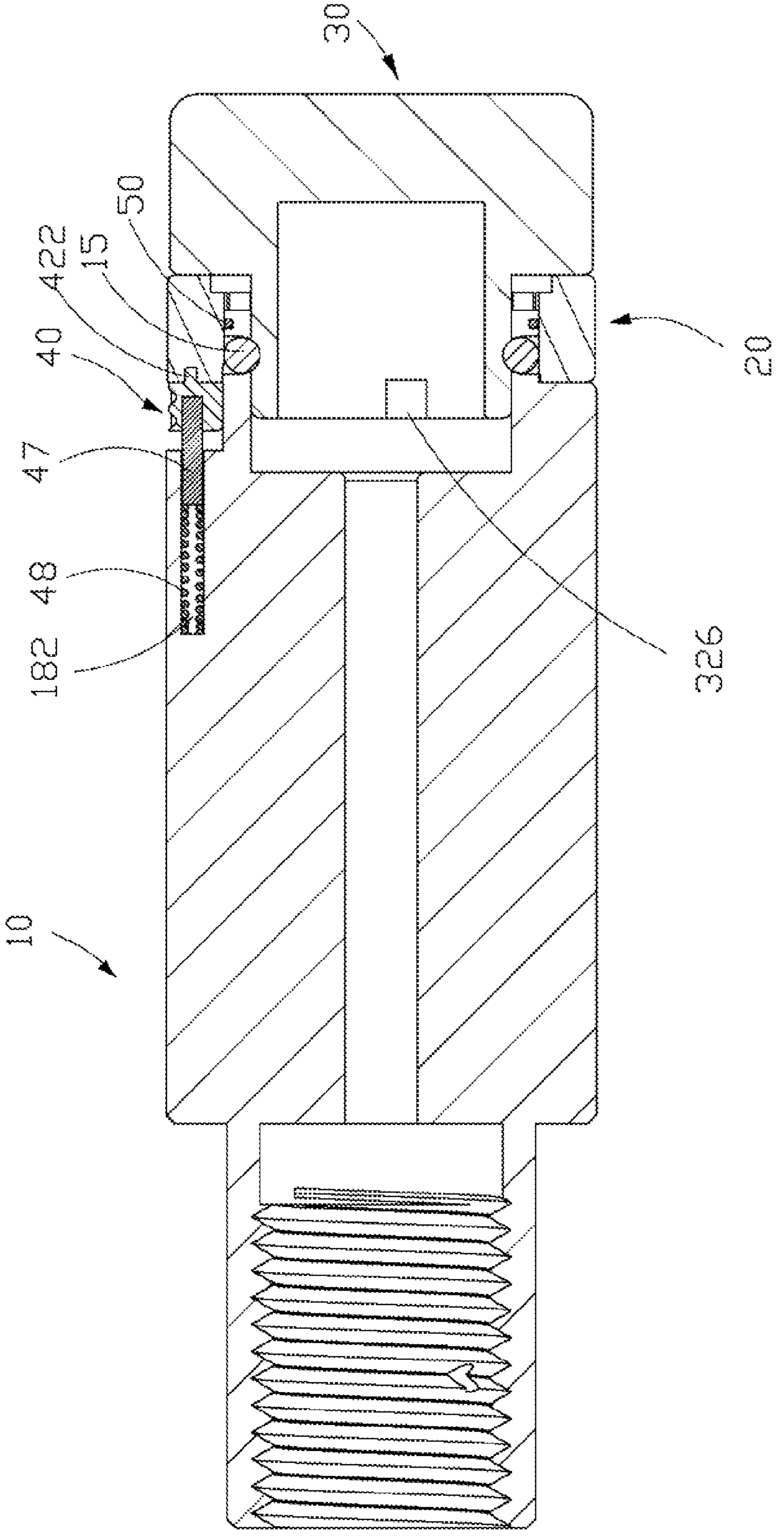
FIG. 7 is a cutaway of the holding fixture of FIG. 1 along an axis of the locking block.

Referring to FIG. 2 and FIG. 7, the first part 10 comprises a first end face 13 and a sleeve 12 extending therefrom. The sleeve 12 defines a plurality of through holes 14 extending along a radial direction thereof. The through holes 14 respectively receive a ball 15 therein, wherein each ball 15 has a diameter larger than a wall thickness of the sleeve 12. In this embodiment, the through holes 14 evenly defined in the sleeve 12 are conical expanding from an inner side of the sleeve 12 to an outer side thereof. The minimum diameters of the through holes 14 are less than those of the balls 15. The sleeve 12 comprises a free end away from the first end face 13 with a slot 16 defined in the outer wall thereof.

A recess 18 is defined in the periphery of the first part 10 and in communication with the first end face 13. A first blind hole 182 is defined in the first part 10 and in communication with the recess 18. The first blind hole 182 is perpendicular to the first end face 13. The first part 10 defines at least one curved sliding groove 19 in the first end face 13 and, in this embodiment, the first part 10 defines two symmetrically opposite curved sliding grooves 19 in the first end face 13.

Figure 3:
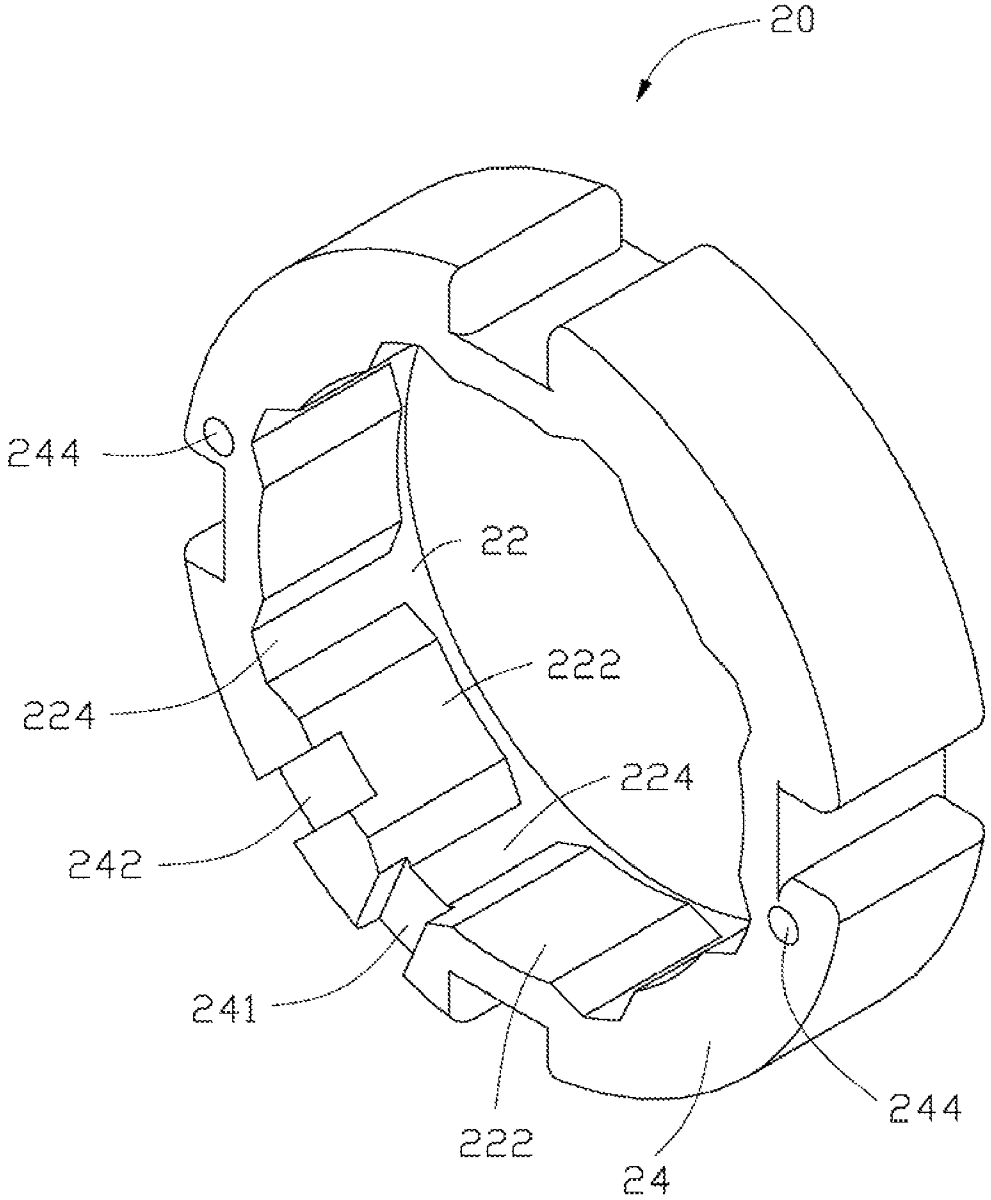
FIG. 3 is a perspective view of a securing member of the holding fixture of FIG. 1.

Referring to FIG. 3, the securing member 20 comprises an inner wall 22 and a second end face 24. A plurality of protrusions 222 are configured on the inner wall 22, wherein every two neighboring protrusions 222 define a notch 224 therebetween. The second end face 24 defines two openings 241, 242 and at least one hole 244. In this embodiment, the second end face 24 defines two symmetrically opposite holes 244. A plurality of protrusions 222 are evenly disposed on the inner wall 22 and a plurality of notches 224 are defined between the neighboring protrusions 222.

Figure 4:
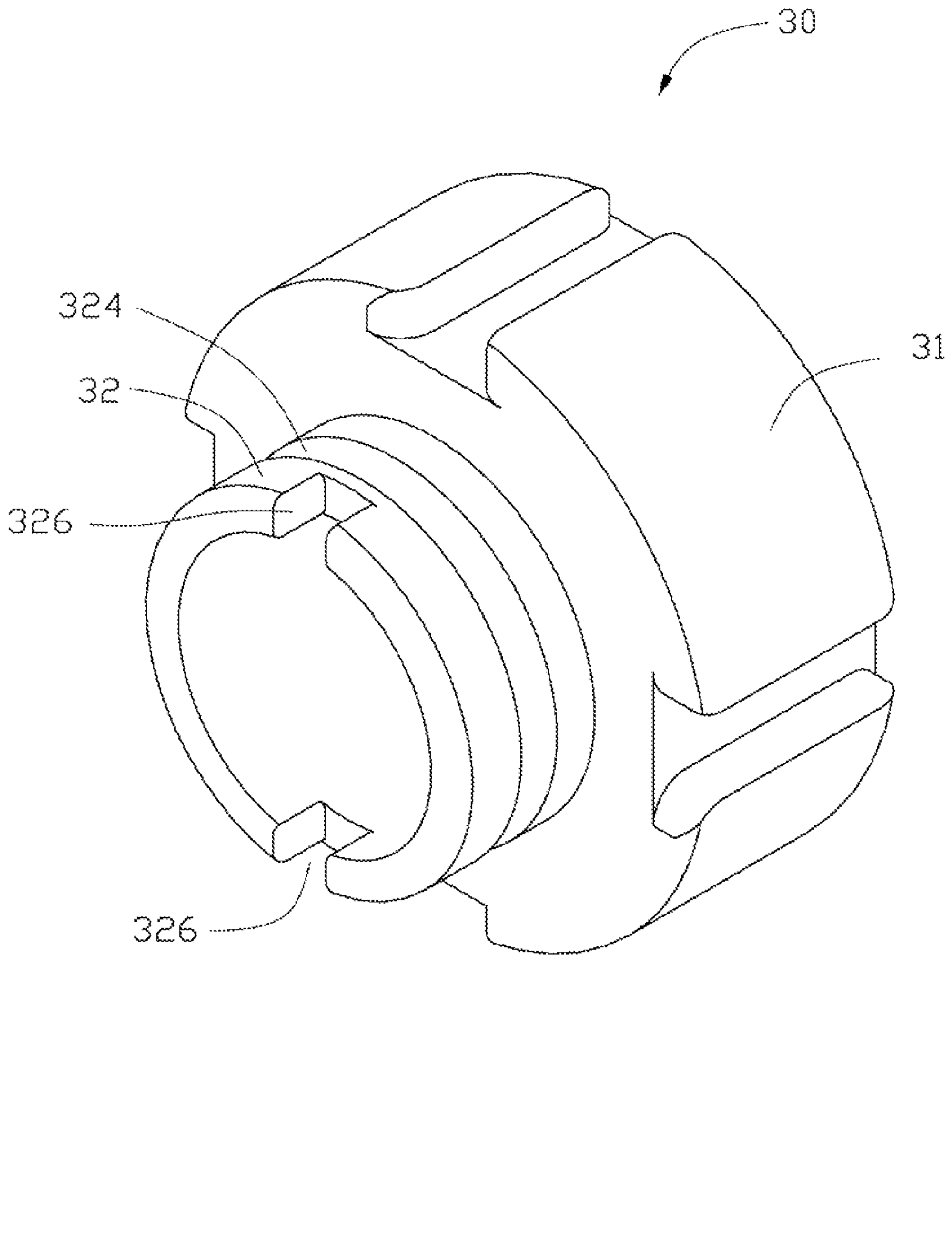
FIG. 4 is a perspective view of a second part of the holding fixture of FIG. 1.

Referring to FIG. 4, the second part 30 comprises a body 31 with a columnar tail 32 fixed thereto, configured for reception in the sleeve 12. In this embodiment, the tail 32 is integrally formed with the body 31. The tail 32 defines an annular groove 324 in the periphery thereof and at least one opening 326 in an end away from the body 31.

Figure 5:
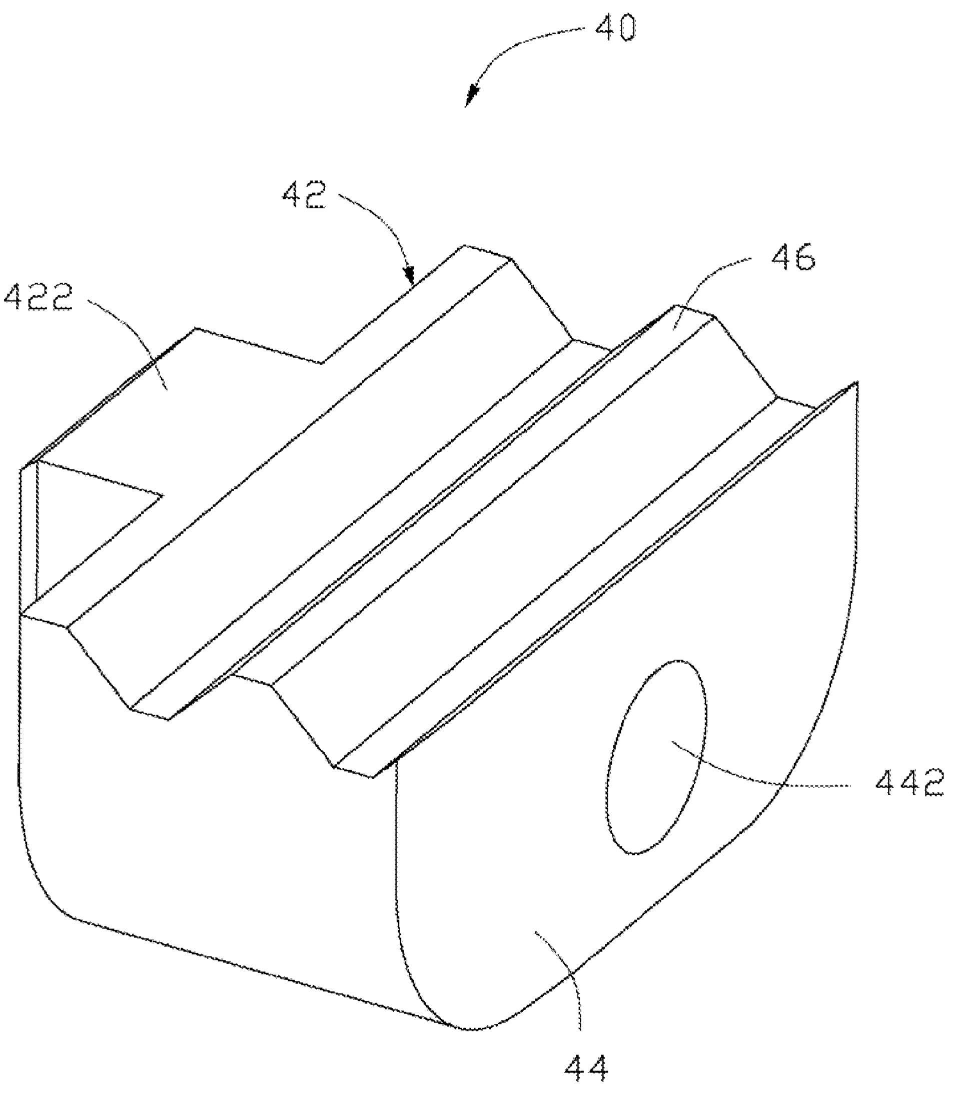
FIG. 5 is a perspective view of a locking block of the holding fixture of FIG. 1.

Referring to FIG. 5, an amplificatory locking block 40 is shown. The locking block 40 comprises a first surface 42, a second surface 44 opposite to the first surface 42 and a side surface 46 connecting the first surface 42 and the second surface 44. A locking portion 422 located on the first surface 42 can match one of the openings 241, 242 to lock or unlock the securing member 20. The second surface 44 defines a second blind hole 442.

Figure 6:
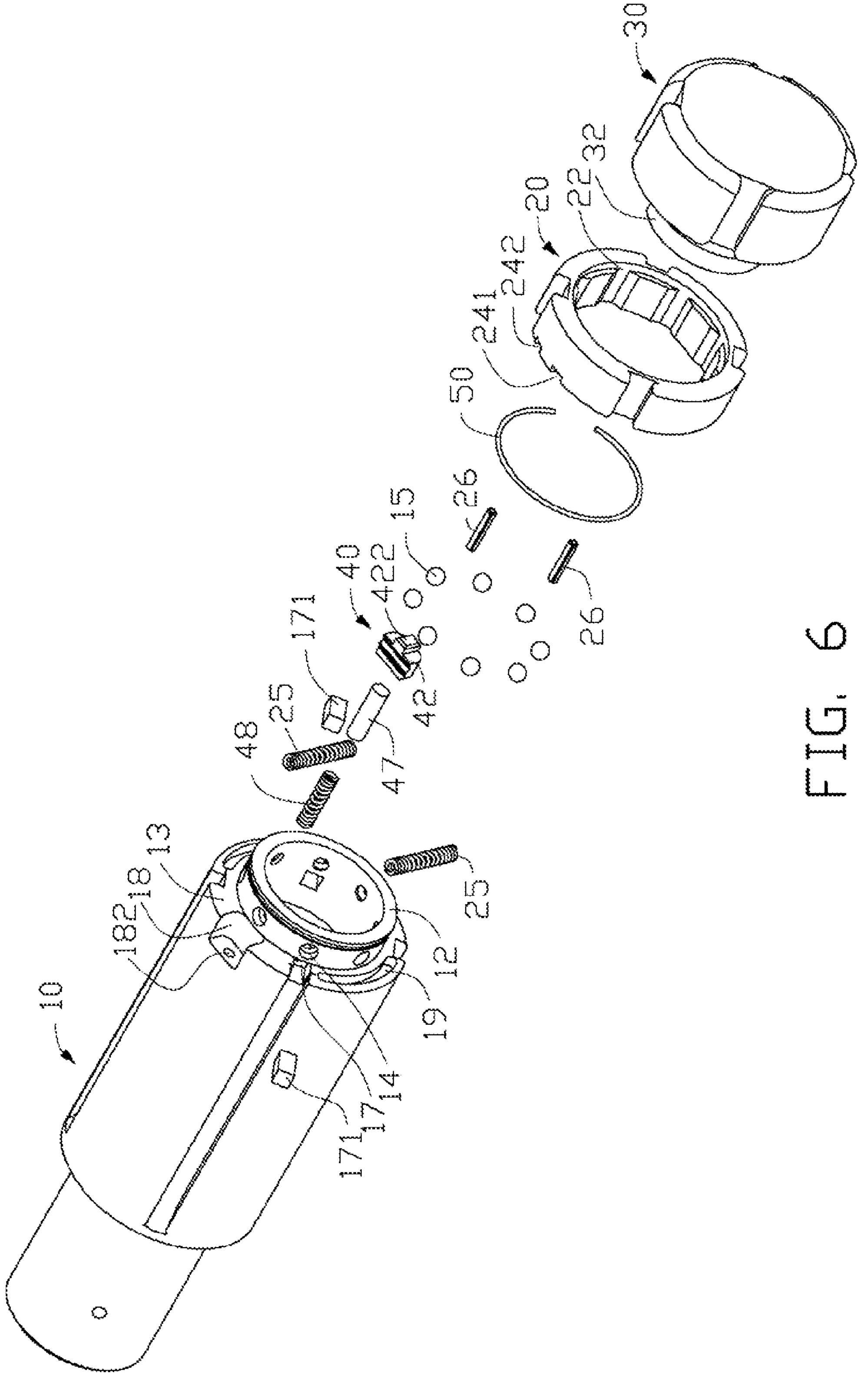
FIG. 6 is an exploded perspective view of the holding fixture of FIG. 1.

Referring to FIG. 6 and FIG. 7, the securing member 20 is located around the sleeve 12 and the second end face 24 corresponds to the first end surface 13. A stop collar 50 is fixed in the annular groove 16 and abuts the inner wall 22 of the securing member 20, thereby applying tension on the inner wall 22 to restrict axial movement of the securing member 20 relative to the first part 10.

At least one positioning block 171 is located between the first part 10 and the second part 30, limiting rotation thereof. The first part 10 defines at least one hole 17, which communicates with at least one opening 326 of the second part 30. One end of the positioning block 171 is fixed in the hole 17 and the other end is received in the opening 326.

When rotating the securing member 20, the protrusions 222 guide the balls 15 into the annular groove 324, positioning the second part 30 on the first part 10 on an axis, as the protrusions 222 of the securing member 20 correspond to the through holes 14 of the first part 10. When the protrusions 222 of the securing member 20 are away from the through holes 14 of the first part 10, the notches 224 of the securing member 20 correspond to the through holes 14 of the first part 10. When the second part 30 is moved away from the first part 10, the balls 15 can move into the notches 224 of the securing member 20. The second part 30 is removable from the first part 10.

The locking block 40 is installed in the recess 18 of the first part 10 via a pin 47, with one end fixed in the second blind hole 442 and the other movable end received in the first blind hole 182. A spring 48 is located between the pin 47 and the bottom of the first blind hole 182 to impel the locking portion 422 into one of the openings 241, 242 of the securing member 20, such that the locking block 40 can move elastically relative to the first part 10. The locking block 40, the pin 47, the spring 48, the recess 18, the first blind hole 182 and the openings 241, 242 of the securing member 20 collaboratively limit rotation of the securing member 20.

Figure 8:
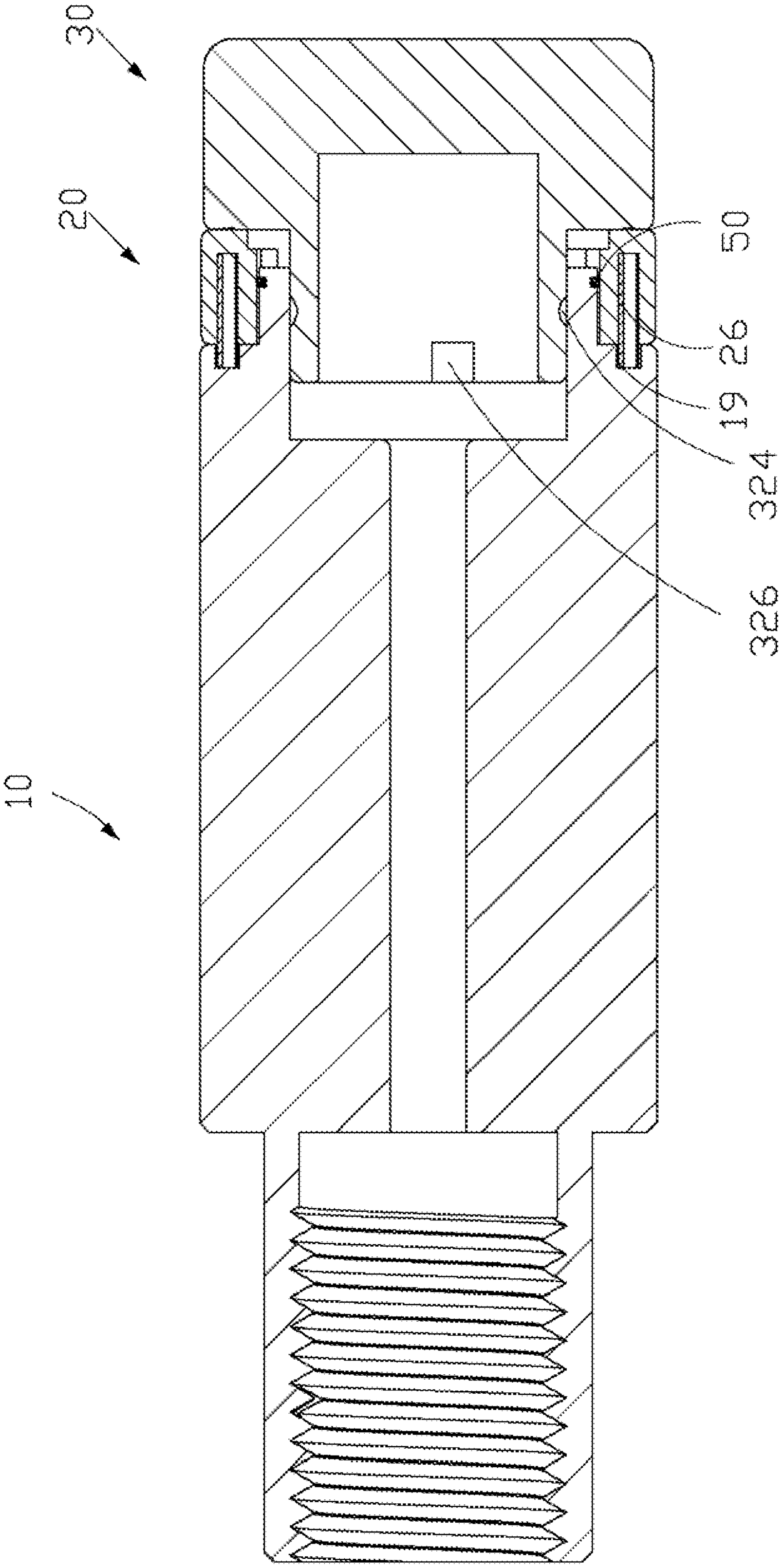
FIG. 8 is a cutaway of the first part of the holding fixture of FIG. 1 along an axis of a slide groove.

Referring to FIG. 6 and FIG. 8, at least one curved sliding groove 19 receives a spring 25 therein. One end of a pin 26 is received in the sliding groove 19 and fixed on one end of the spring 25, while the other end of the pin 26 is received in the hole 244 of the securing member 20. In this embodiment, the pin 26 securely fits in the hole 244. In other embodiments, the pin 26 can also be screwed into the hole 244 or connected via other means. When the securing member 20 is rotated, the pin 26 moves in the sliding groove 19 and compresses the spring 25.

When mounting the second part 30 onto the first part 10, the locking block 40 is moved towards the first blind hole 182 of the first part 10, and the second part 30 inserted into the sleeve 12, and securing member 20 rotated to impel the ball 15 into the annular groove 324 via the protrusions 222 corresponding to the through holes 14 of the first part 10. Upon its release, the locking block 40 moves toward the securing member 20 until the lock portion 422 is received in the opening 242 to lock the holding fixture. In this state, the spring 25 is compressed.

Removal of the second part 30 from the first part 10 entails the locking block 40 moving toward the first blind hole 182 of the first part 10 until the lock portion 422 is removed from the opening 242 with the spring 48 being compressed. In this state, the unlocked securing member 20 can rotate along the sliding groove 19 under the force of the spring 25 together with the pin 26 and, accordingly, the protrusions 222 move away from the balls 15. As a result, the balls 15 are allowed into the notches 224 of the securing member 20. In this state, upon its release, the locking block 40 moves toward the securing member 20 under the force of the spring 48 until the locking portion 422 is received in the opening 241 to lock the securing member 20. The second part 20 can easily be with drawn and removed from the first part 10.

Mounting or removal of second part 30 on or from the first part 10 can be accomplished without requiring any tool, with convenience and efficiency.

While exemplary embodiments have been described above, it should be understood that they have been presented by way of example only and not by way of limitation. Thus, the breadth and scope of the present invention should not be limited by the above-described exemplary embodiments, but should be defined only in accordance with the following claims and their equivalents.

What is claimed is:

1. A holding fixture, comprising:

a first part, comprising a first end face and a sleeve extending therefrom, the sleeve defining a plurality of radial through holes each receiving a ball therein, each ball having a diameter larger than a wall thickness of the sleeve therein, the first part further defining a recess in communication with the first end face and a first blind hole in communication with the recess;

a securing member located around the sleeve, comprising a plurality of protrusions configured on an inner wall thereof, every two neighboring protrusions defining a notch therebetween;

a locking block located between the first part and the securing member, limiting rotation of the securing member relative to the first part, wherein the locking block defines a second blind hole and is installed in the recess via a pin with one end fixed in the second blind hole and the other end thereof is movably received in the first blind hole;

a spring located between the pin and the bottom of the first blind hole; and a second part, comprising a body and a tail fixed to the body, the tail defining an annular groove in the periphery thereof to enable seating thereof in the sleeve;

wherein the protrusions guide the balls into the annular groove to secure the second part on the first part.

2. The holding fixture as claimed in claim 1, wherein the through holes are conical and expand from an inner side of the sleeve to an outer side thereof, wherein the minimum diameter of the through holes is less than that of the balls.

3. The holding fixture as claimed in claim 1, further comprising a stop collar located between the sleeve of the first part and the securing member for restricting axial movements thereof.

4. The holding fixture as claimed in claim 3, wherein the sleeve comprises a free end away from the first end face, with a slot defined in the outer wall of the free end, and the stop collar is fixed in the slot and abuts the inner wall of the securing member.

5. The holding fixture as claimed in claim 1, further comprising at least one positioning block interfering with the first part and the second part to limit relative rotations therebetween.

6. The holding fixture as claimed in claim 5, wherein the second part defines at least one opening, the first part defines at least one hole corresponding to the at least one opening of the second part, and the positioning block is received in the hole and the opening.

7. The holding fixture as claimed in claim 1, wherein the securing member defines two openings, and the locking block comprises a locking portion matching one of the openings to lock or unlock the securing member.

8. The holding fixture as claimed in claim 1, wherein the first part defines at least one curved sliding groove in the first end face, with the at least one curved sliding groove receiving a spring therein, and one end of a pin is fixed on one end of the spring, with the other end of the pin fixed on the securing member.

9. The holding fixture as claimed in claim 1, wherein the through holes are conical and expand from an inner side of the sleeve to an outer side thereof, and the minimum diameter of the through holes is less than that of the balls.

10. The holding fixture as claimed in claim 1, further comprising a stop collar located between the sleeve of the first part and the securing member, restricting axial movements thereof.

11. The holding fixture as claimed in claim 1, further comprising at least one positioning block interfering with the first part and the second part to limit relative rotations therebetween.

* * * * *